US008203914B2

(12) United States Patent
Yamazaki

(10) Patent No.: US 8,203,914 B2
(45) Date of Patent: Jun. 19, 2012

(54) DISC STORAGE APPARATUS AND DISC STORAGE METHOD

(75) Inventor: Hidenori Yamazaki, Tokyo (JP)

(73) Assignee: Sony Corporation, Tokyo (JP)

( * ) Notice: Subject to any disclaimer, the term of this patent is extended or adjusted under 35 U.S.C. 154(b) by 499 days.

(21) Appl. No.: 12/384,075

(22) Filed: Mar. 31, 2009

(65) Prior Publication Data

US 2009/0245035 A1 Oct. 1, 2009

(30) Foreign Application Priority Data

Apr. 1, 2008 (JP) ................................ P2008-095439

(51) Int. Cl.
*G11B 21/08* (2006.01)
*G11B 17/22* (2006.01)

(52) U.S. Cl. .................................. 369/30.01; 369/30.51

(58) Field of Classification Search ................. 369/30.3, 369/30.51, 34.01
See application file for complete search history.

(56) References Cited

U.S. PATENT DOCUMENTS 5,726,960 A * 3/1998 Yoshida et al. .............. 369/30.3
2005/0128890 A1* 6/2005 Becker et al. .............. 369/30.27
2005/0193015 A1* 9/2005 Logston et al. ............ 707/104.1

FOREIGN PATENT DOCUMENTS

JP 07176176 A 7/1995
JP 08306170 A 11/1996
JP 2000276835 A 10/2000
JP 2004079080 A 3/2004

OTHER PUBLICATIONS

Office Action from Japanese Application No. 2008-095439, dated Mar. 9, 2010.
Office Action from Japanese Application No. 2008-095439, dated Apr. 5, 2011.

* cited by examiner

*Primary Examiner* — Hoai V Ho
*Assistant Examiner* — Min Huang
(74) *Attorney, Agent, or Firm* — Lerner, David, Littenberg, Krumholz & Mentlik, LLP

(57) ABSTRACT

A disc storage apparatus includes a disc changer mechanism including a disc slot through which a disc is insertable, a storage section having storage locations that are capable of storing discs inserted through the disc slot, and a transport mechanism that transports the disc, inserted through the disc slot, to any of the storage locations in the storage section. The apparatus further includes an operation section having operations keys; a display section; and a controller that associates, when the disc is inserted and any of the operations keys is operated, the operated operation key with the storage location in which the disc is stored. In accordance with a predetermined operation on the operation section, the controller extracts all discs stored in the storage locations associated with the operated operation key and causes information regarding all the extracted discs to be displayed on the display section.

4 Claims, 7 Drawing Sheets

100
DISPLAY SECTION 5
MEMORY 4
OPERATION SECTION 2
21-1 KEY
21-2 KEY
21-N KEY
MAIN CONTROLLER 3
200
300 CDDB
CHANGER-MECHANISM CONTROLLER 6
DISC CHANGER MECHANISM 1
11 DRIVE
12 STORAGE SECTION
13 DISC SLOT
TRANSPORT MECHANISM 14

100
200
300
CDDB
1
DISC CHANGER MECHANISM
14
TRANSPORT MECHANISM
DRIVE
STORAGE SECTION
DISC SLOT
11
12
13
4
MEMORY
3
MAIN CONTROLLER
6
CHANGER-MECHANISM CONTROLLER
5
DISPLAY SECTION
2
OPERATION SECTION
KEY
KEY
KEY
21-1
21-2
21-N

101
OPERATION SECTION
SELECTION KEY
EXECUTION KEY
2
22
23
DISPLAY SECTION
5
MEMORY
4
MAIN CONTROLLER
3
CHANGER-MECHANISM CONTROLLER
6
DISC CHANGER MECHANISM
1
DRIVE
11
STORAGE SECTION
12
DISC SLOT
13
TRANSPORT MECHANISM
14

DISC STORAGE APPARATUS AND DISC STORAGE METHOD

CROSS REFERENCES TO RELATED APPLICATIONS

The present application claims priority from Japanese Patent Application No. JP 2008-095439, filed in the Japanese Patent Office on Apr. 1, 2008, the entire content of which is incorporated herein by reference.

BACKGROUND OF THE INVENTION

1. Field of the Invention

The present invention relates to a disc storage apparatus and a disc storage method which can store multiple discs.

2. Description of the Related Art

A disc storage apparatus is available that can store multiple discs, such as CDs (compact discs), DVDs (digital versatile discs), BDs (Blu-ray Discs®) and that can select a desired one of the discs in accordance with a user operation.

When multiple discs are stored in such a disc storage apparatus, it is desired to provide a mechanism that enables the user to know what types of discs are stored.

SUMMARY OF THE INVENTION

For example, a method in which multiple discs are classified into categories and are the classified discs are shown to the user is available in order to allow the user to easily find a desired one of the discs.

In this case, the discs are typically classified into categories on the basis of various types of information regarding the discs. Examples of the information include the genres of content stored on the discs, performers, and title names. To achieve such classification, the various types of information associated with the discs generally need to be manually pre-input and stored by the user or the like.

However, in order for the user to input the various types of information associated with the discs, a large amount of time and effort is involved.

Recently, a search service that connects to a database over the Internet to automatically provide various types of information (such as titles, genres, and performers) regarding discs from the database on the basis of TOC (table of contents) information pre-written to discs has been put to practical use. The use of such a search service allows various types of information regarding multiple discs to be obtained without the user's cumbersome work and also allows the discs to be classified into categories on the basis of the obtained information.

When the number of discs is particularly large or when access to the Internet is not available, the above-described method for classifying discs into categories on the basis of various types of information regarding discs has disadvantages in that it is difficult for the user to recognize the discs and it is also difficult for the user to find a desired disc.

Even when various types of information regarding the discs are obtained over the Internet or the like, there is also a disadvantage in that it is not easy to find a desired disc when a large number of discs are stored.

The present invention has been conceived to overcome the disadvantages described above, and it is desirable to provide a disc storage apparatus and a disc storage method which allow a desired disc to be easily recognized even when multiple discs are stored.

In order to overcome the above-described disadvantages, according to one embodiment of the present invention, there is provided a disc storage apparatus. The disc storage apparatus includes a disc changer mechanism including a disc slot through which a disc is insertable, a storage section having storage locations that are capable of storing discs inserted through the disc slot, and a transport mechanism that transports the disc, inserted through the disc slot, to any of the storage locations in the storage section. The disc storage apparatus further includes an operation section having operations keys; a display section; and a controller configured to cause, when the disc is inserted through the disc slot and any of the operations keys is operated, the transport mechanism to store the inserted disc in any of the storage locations, and to associate the operated operation key with the storage location in which the disc is stored. In accordance with a predetermined operation that is performed on the operation section and that includes an operation performed on any of the operation keys, the controller extracts, of discs stored in the storage section, all discs stored in the storage locations associated with the operated operation key, and causes information regarding all the extracted discs to be displayed on the display section.

According to another embodiment of the present invention, there is provided a disc storage method for a disc storage apparatus having: a disc changer mechanism including a disc slot through which a disc is insertable, a storage section having storage locations that are capable of storing discs inserted through the disc slot, and a transport mechanism that transports the disc inserted through the disc slot to any of the storage locations in the storage section; an operation section having operations keys; and a display section. The disc storage method includes the steps of determining whether or not any of the operation keys is operated; determining whether or not a disc is inserted through the disc slot, when it is determined in the operation-key operation determining step that any of the operation keys is operated; causing the transport mechanism to store the inserted disc in any of the storage location, when it is determined that the disc is inserted through the disc slot in the inserted-disc determining step; associating the operated key determined to be operated in the operation-key determination step with the storage location in which the disc is stored in the disc storing step; determining whether or not a predetermining operation including an operation on any of the operation keys is performed on the operation section; extracting, of discs stored in the storage section, all discs stored in the storage locations associated with the operated operation key, when it is determined that the predetermined operation is performed in the predetermined-operation determining step; and displaying information, on the display section, information regarding all the discs extracted in the disc extracting step.

According to a third embodiment of the present invention, there is provided a disc storage apparatus. The disc storage apparatus includes: a disc changer mechanism including a disc slot through which a disc is insertable, a storage section having storage locations that are capable of storing discs inserted through the disc slot, and a transport mechanism that transports the disc, inserted through the disc slot, to any of the storage locations in the storage section; an operation section having a selection key and an execution key; a display section; and a controller configured to cause, when the disc is inserted through the disc slot, the selection key is operated at least once, and the execution key is operated, the transport mechanism to store the inserted disc in any of the storage locations, and to associate the number of operations of the selection key with the storage location in which the disc is stored. In accordance with a predetermined operation that is performed on the operation section and that includes at least one operation performed on the selection key, the controller extracts, of discs stored in the storage section, all discs stored in the storage location associated with the number of operations of the selection key, and causes information regarding all the extracted discs to be displayed on the display section.

According to the present invention, it is possible to provide a disc storage apparatus and a disc storage method which allow a desired disc to be easily recognized even when a large number of discs are stored.

DESCRIPTION OF THE PREFERRED EMBODIMENTS

Embodiments of the present invention will be described below.

<First Embodiment>

Figure 1:
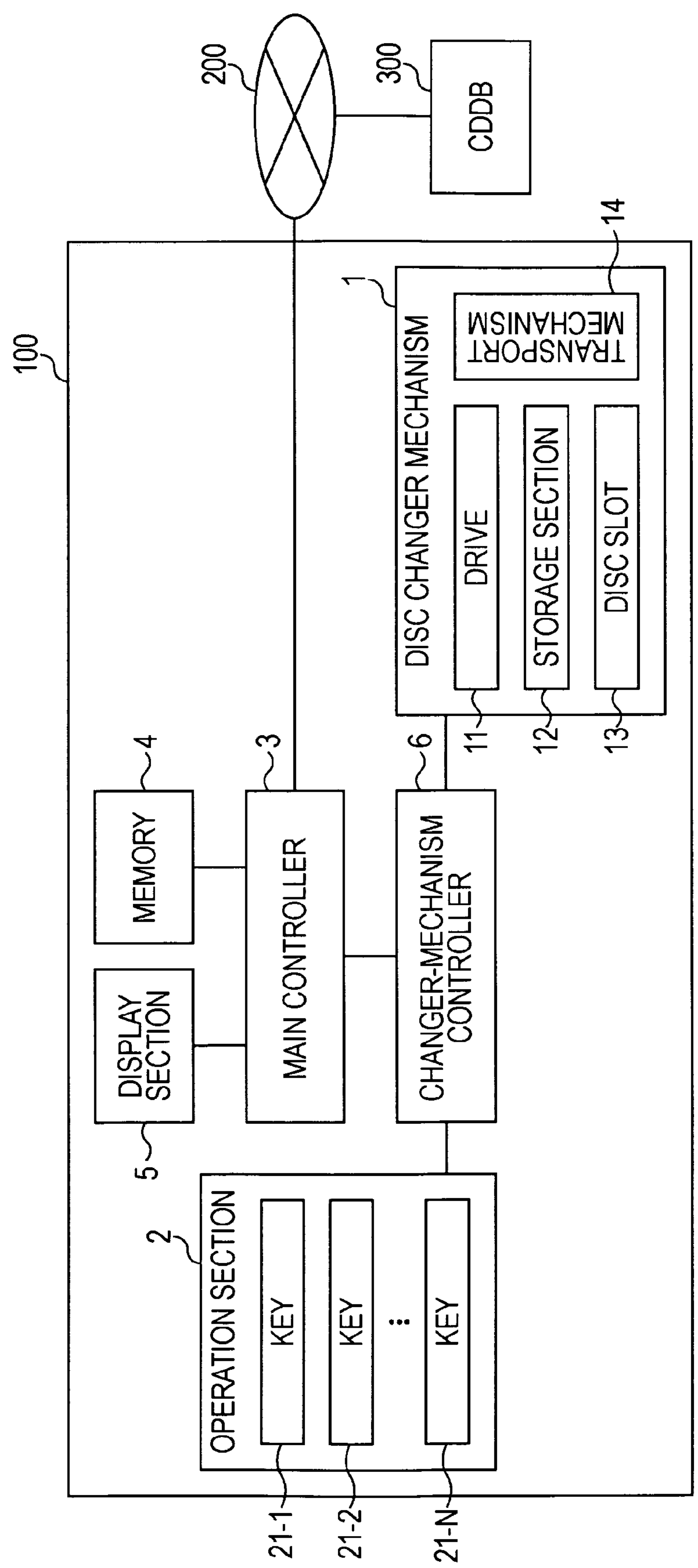
FIG. 1 is a block diagram showing one example of the configuration of a disc storage apparatus according to a first embodiment of the present invention.

FIG. 1 is a block diagram showing an example of the configuration of a disc storage apparatus 100 according to a first embodiment of the present invention.

As shown in FIG. 1, the disc storage apparatus 100 according to the embodiment of the present invention includes a disc changer mechanism 1, an operation section 2, a main controller 3, a memory 4, a display section 5, and a changer-mechanism controller 6.

The disc changer mechanism 1 stores multiple discs, for example, CDs, DVDs, and BDs, so that one of which can be selected and retrieved for use. The disc changer mechanism 1 has a drive 11, a storage section 12, a disc slot 13, and a transport mechanism 14.

The drive 11 serves as a drive device for reading and reproducing data from the disc and for writing data to the disc.

The storage section 12 has multiple storage locations for storing multiple discs.

The disc slot 13 is a portion through which a disc can be inserted into the disc changer mechanism 1.

The transport mechanism 14 transports the disc.

An example of the operation of the disc changer mechanism 1 will be briefly described.

When a disc is inserted through the disc slot 13, the transport mechanism 14 transports the inserted disc to the disc storage section 12 for storage. The storage section 12 includes, for example, disc-shaped members (not shown), each having a storage location for storing a disc. The transport mechanism 14 can selectively retrieve an arbitrary one of discs stored in the storage locations of the storage section 12 and can transport the selected disc to the disc slot 13 or the drive 11. The drive 11 writes data to or reads data from the disc transported from the transport mechanism 14. The above-described operations of the disc changer mechanism 1 are controlled by the changer-mechanism controller 6, which is described below.

The storage section 12 in the first embodiment may be designed so as to store a larger number of discs, for example, about 200 to 300 discs.

The operation section 2 receives a user operation performed on the disc storage apparatus 100.

The operation section 2 has N keys 21 (N is a positive integer). As shown in FIG. 1, the keys are numbered 21-1, 21-2, . . . , and 21-N.

The keys 21-1 to 21-N have external characteristics (e.g., color and shape) that are different from one another so as to facilitate that they can be visually distinguished therebetween by a user.

The main controller 3 controls the overall operation of the disc storage apparatus 100. That is, the main controller 3 executes various operations of the disc storage apparatus 100, for example, in accordance with a user operation performed on the operation section 2. In particular, the main controller 3 issues an instruction for causing the changer-mechanism controller 6 to control the operation of the disc changer mechanism 1, in accordance with a user operation performed on the operation section 2 and so on.

The main controller 3 is also connected to a network 200 (e.g., the Internet). The main controller 3 can cause the drive 11 in the disc changer mechanism 1 to read TOC (table of contents) information pre-written to a disc, can connect to a TOC-information-based search service section, for example, a CDDB (compact disc data base) 300, on the network 200 to obtain various types of information regarding the disc, and can store the obtained information in the memory 4. Examples of the various types of information regarding the disc include the title (name) of the disc, the title of recorded content, an artist, a performer, a songwriter, and the date of sale.

The memory 4 is connected to, for example, the main controller 3 and stores various types of information regarding various operations of the disc storage apparatus 100. The memory 4 is implemented by, for example, a nonvolatile memory, such as an EEPROM (electrically erasable programmable read only memory), a HDD (hard disk drive), or the like.

The display section 5 includes a liquid crystal display (LCD) device, an organic electroluminescent (EL) display device, or the like, and performs various display operations in accordance with control performed by the main controller 3. For example, the display section 5 can perform display for guidance or the like for prompting the user to select a desired one of the discs stored in the storage section 12 in the disc changer mechanism 1.

The changer-mechanism controller 6 controls the operation of the disc changer mechanism 1 in accordance with an instruction from the main controller 3.

An example of operation when the user inserts a disc into the disc storage apparatus 100 according to the first embodiment and the inserted disc is stored in the storage section 12 in the disc changer mechanism 1 will now be described with reference to FIG. 2.

In step ST1, the main controller 3 determines whether or not a predetermined operation is performed on the operation section 2. When it is determined that the predetermined operation is performed on the operation section 2, the process proceeds to step ST2. When it is determined that the predetermined operation is not performed, step ST1 is repeated. The predetermined operation performed on the operation section 2 in step ST1 refers to, for example, an operation of pressing an open key (not shown) provided on the operation section 2.

In step ST2, the main controller 3 opens the disc slot 13 of the disc changer mechanism 1 in response to the predetermined operation performed on the operation section 2 in step ST1.

In step ST3, the main controller 3 determines whether or not any of the keys 21-1 to 21-N of the operation section 2 is operated. When it is determined that any of the keys 21-1 to 21-N of the operation section 2 is operated, the process proceeds to step ST4. When it is determined that any of the keys 21-1 to 21-N is not operated, step ST3 is repeated.

In step ST4, the main controller 3 closes the disc slot 13 of the disc changer mechanism 1 in response to the operation of any of the keys 21-1 to 21-N in step ST3.

In step ST5, the main controller 3 determines whether or not a disc is inserted through the disc slot 13 opened in step ST2 before it is closed in step ST4. When it is determined that a disc is inserted, the process proceeds to step ST6. When it is determined that no disc is inserted, the processing ends.

In step ST6, the main controller 3 stores, in the storage section 12 in the disc changer mechanism 1, the disc inserted through the disc slot 13 between step ST2 and step ST4.

In step ST7, the main controller 3 associates the storage location in which the disc is stored in step ST6, the storage location being provided in the storage section 12, with the key operated when the disc slot 13 was closed in step ST4.

More specifically, it is assumed that the key operated in step ST4 is, for example, a key 21-n (n is an integer that satisfies $1 \leqq n \leqq N$). It is also assumed that the number of discs that can be stored in the storage section 12 is M (i.e., M storage locations are provided therein), the storage locations are numbered 1 to M, and the storage location in which the disc is stored in step ST6 is the m-th storage location (m is an integer that satisfies $1 \leqq m \leqq M$). In this case, the main controller 3 associates a key parameter n indicating which key was operated to close the disc slot 13 with a storage parameter m indicating the number of the storage location in which the disc was stored, to thereby create, for example, a disc storage table, and causes the disc storage table to be stored in the memory 4.

Figure 2:
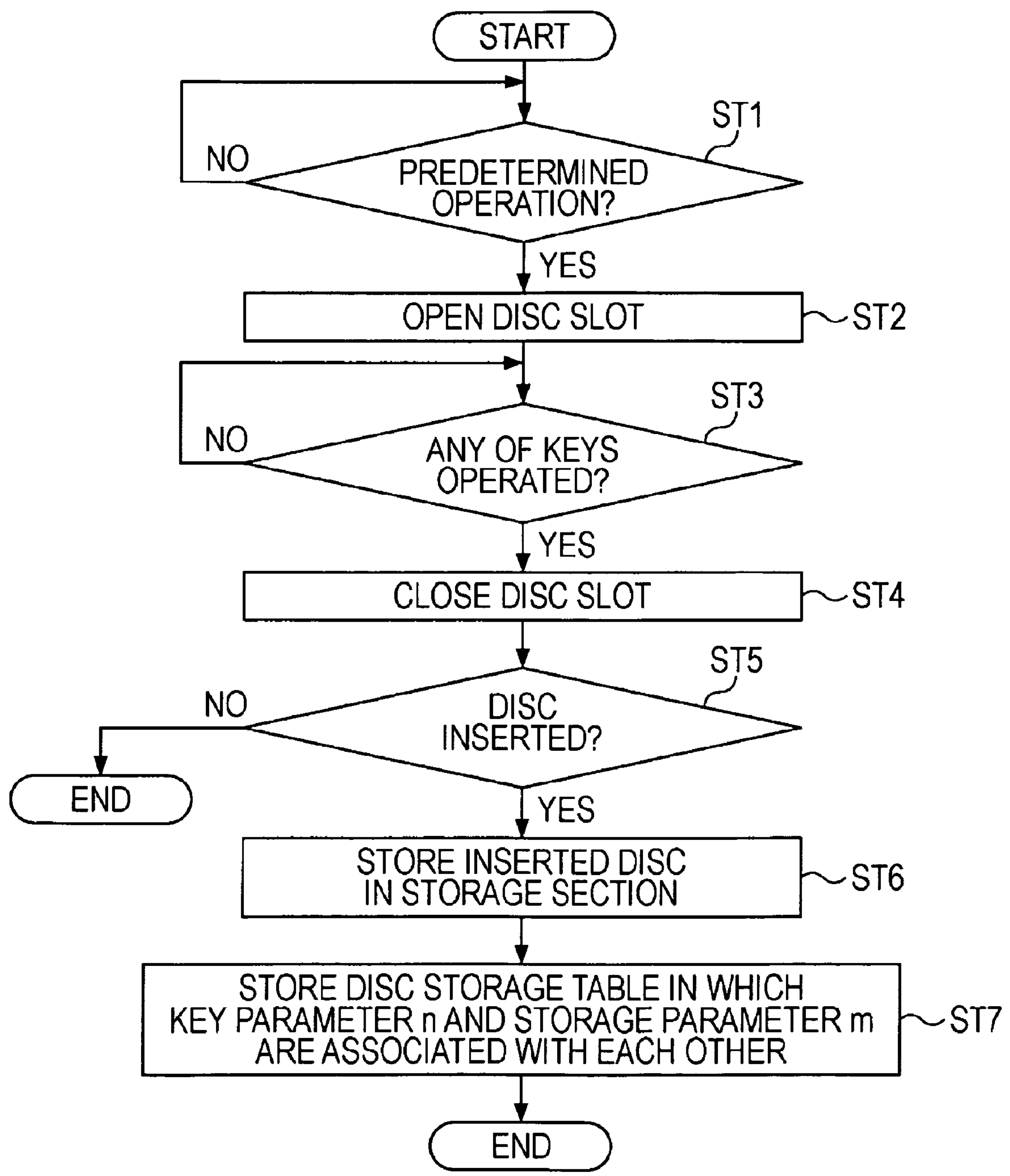
FIG. 2 is a flowchart illustrating an example of operation when a user inserts a disc into the disc storage apparatus and the inserted disc is stored in a storage section in a disc changer mechanism.

The main controller 3 may be configured so as to obtain, in the flowchart shown in FIG. 2, various types of information regarding data on the stored disc from the network 200 on the basis of the TOC information of the disc and to additionally store the obtained information into the disc storage table created in step ST7. An example of operation of the disc storage apparatus 100 in such a case is shown in FIG. 3.

Figure 3:
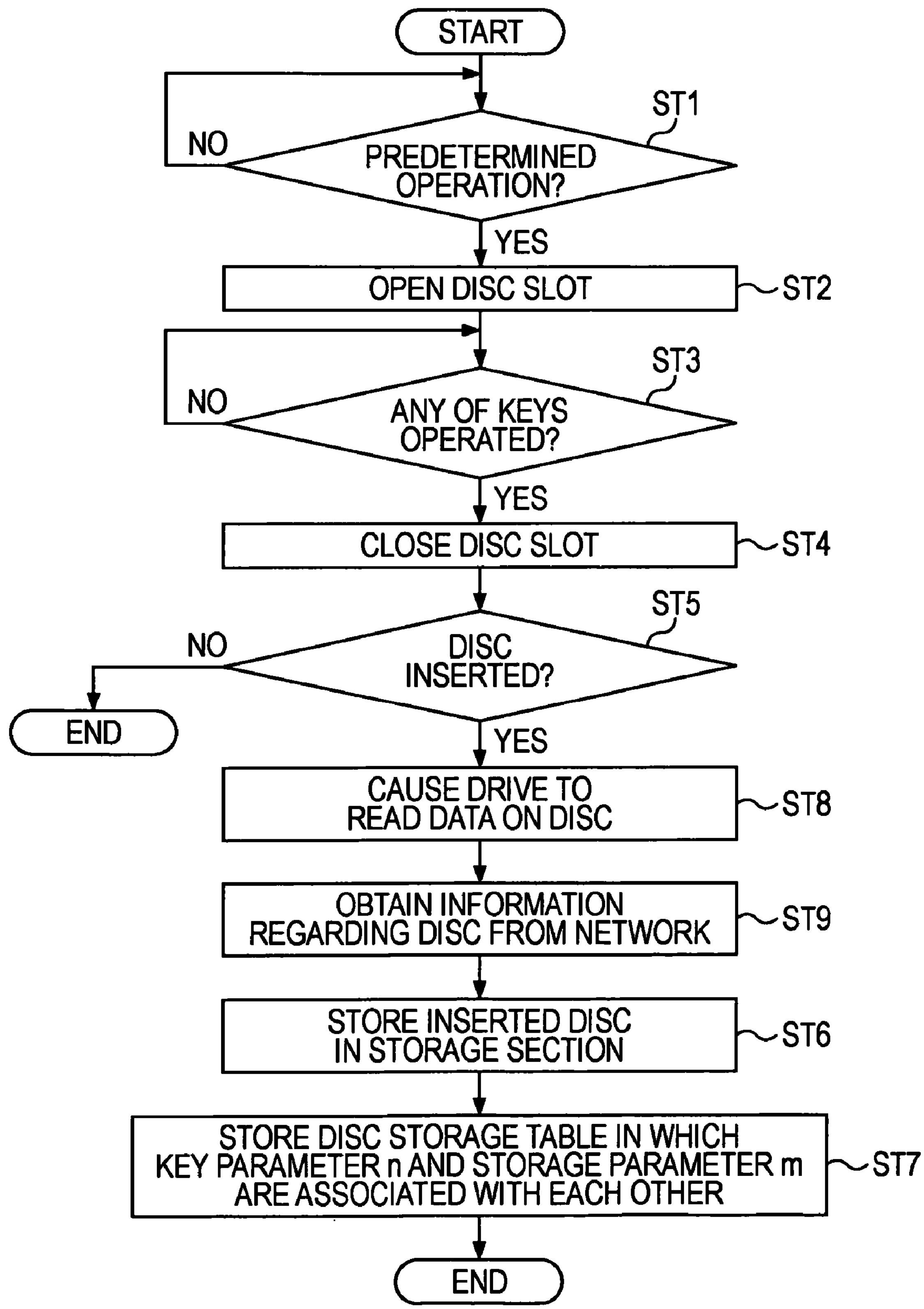
FIG. 3 is a flowchart illustrating an example of operation of the disc storage apparatus when various types of information regarding data on the disc is obtained from a network.

FIG. 3 is a flowchart illustrating an example of operation of the disc storage apparatus 100 when various types of information regarding data on the disc are obtained from the network 200. As shown in FIG. 3, in the example of operation of the disc storage apparatus 100 when various types of information regarding data on the disc are obtained from the network 200, steps ST8 and ST9 are further included between step ST5 and step ST6 in the above-described flowchart shown in FIG. 2. In step ST8, the main controller 3 causes the changer-mechanism controller 6 to transport the disc, inserted into the transport mechanism 14, to the drive 11 and causes the drive 11 to read data on the disc. In step ST9, on the basis of the data read from the disc under the control of the main controller 3, various types of information regarding the disc is obtained from the network 200.

Although the predetermined operation performed on the operation section 2 in step ST1 in order to open the disc slot 13 in step ST2 has been described in the above-described flowchart in FIG. 2 as, for example, pressing the open key (not shown) of the operation section 2, the present invention is not limited thereto. For example, the disc slot 13 may be opened upon operation of any of the keys 21-1 to 21-N.

When a disc is inserted and stored, the disc storage apparatus 100 operates as described above to thereby cause the inserted and stored disc to be associated with the key operated when the disc was inserted.

The disc storage apparatus 100 according to the first embodiment of the present invention may be used for the following application.

Now, a case in which four users A, B, C, and D use the disc storage apparatus 100 will now be discussed as a specific example of application of the disc storage apparatus 100 according to the first embodiment.

The four users A to D perform presetting so that that they operate corresponding different ones of the keys 21-1 to 21-N of the operation section 2 when they insert their discs into the disc storage apparatus 100 and close the disc slot 13. For example, it is assumed that the users performs presetting so that that the users A, B, C, and D operate the keys 21-1, 21-2, 21-3, and 21-4, respectively.

With such presetting, key parameters n corresponding to the respective users A to D, each key parameter n indicating which key was operated to close the disc slot 13, are associated with storage parameters m indicating the storage locations in the storage section 12 and are stored in the memory 4 as a disc storage table.

Thus, in this example, a disc inserted by the user A is stored in the storage location associated with n=1 in the disc storage table stored in the memory 4. A disc inserted by the user B is stored in the storage location associated with n=2 in the disc storage table. A disc inserted by the user C is stored in the storage location associated with n=3 in the disc storage table. A disc inserted by the user D is stored in the storage location associated with n=4 in the disc storage table. That is, a disc inserted into the disc storage apparatus 100 is associated with any of the users A to D. This arrangement allows multiple users to organize discs with the disc storage apparatus 100.

Although a case in which presetting is performed so that keys that are to be operated to close the disc slot 13 after insertion of a disc into the disc slot 13 are different from one another for respective users has been described above as one example of a specific application of the disc storage apparatus 100 according to the first embodiment, the application of the disc storage apparatus 100 according to first embodiment is not limited thereto.

For example, even when one user uses the disc storage apparatus 100, it may be preset such that different keys are operated for respective genres of content, stored on the disc, to close the disc slot 13. With this arrangement, even when a large number of discs are stored in the disc storage apparatus 100, all discs stored therein are associated with any of the genres. This makes it easier to find a desired disc. More specifically, the disc storage apparatus 100 is preset so that, (1) when a DVD containing a foreign movie is inserted, the key 21-1 is operated, (2) when a DVD containing a Japanese movie is inserted, the key 21-2 is operated, (3) when a DVD containing a music clip is inserted, the key 21-3 is operated, (4) when a music DC is inserted, the key 21-4 is operated, and (5) when a DVD containing other genres is inserted, the key 21-N is operated. This arrangement makes it easier to organize the discs, since (1) foreign-movie DVDs are stored in the storage locations associated with the key parameter n=1 in the disc storage table, (2) Japanese-movie DVDs are stored in the storage locations associated with the key parameter n=2, (3) music-clip DVDs are stored in the storage locations associated with the key parameter n=3, (4) music DVDs are stored in the storage locations associated with the key parameter n=4, and (5) other discs are stored in the storage locations associated with the key parameter n=N.

That is, the disc storage apparatus 100 according to the first embodiment is configured to allow for presetting so that different keys are operated for different categories to close the disc slot 13, to thereby make it easy to classify and organize the discs according to the categories.

Now, a description will be given of an example of the operation of the disc storage apparatus 100 when the user searches for a desired one of discs inserted into and stored in the disc storage apparatus 100, as described above.

Figure 4:
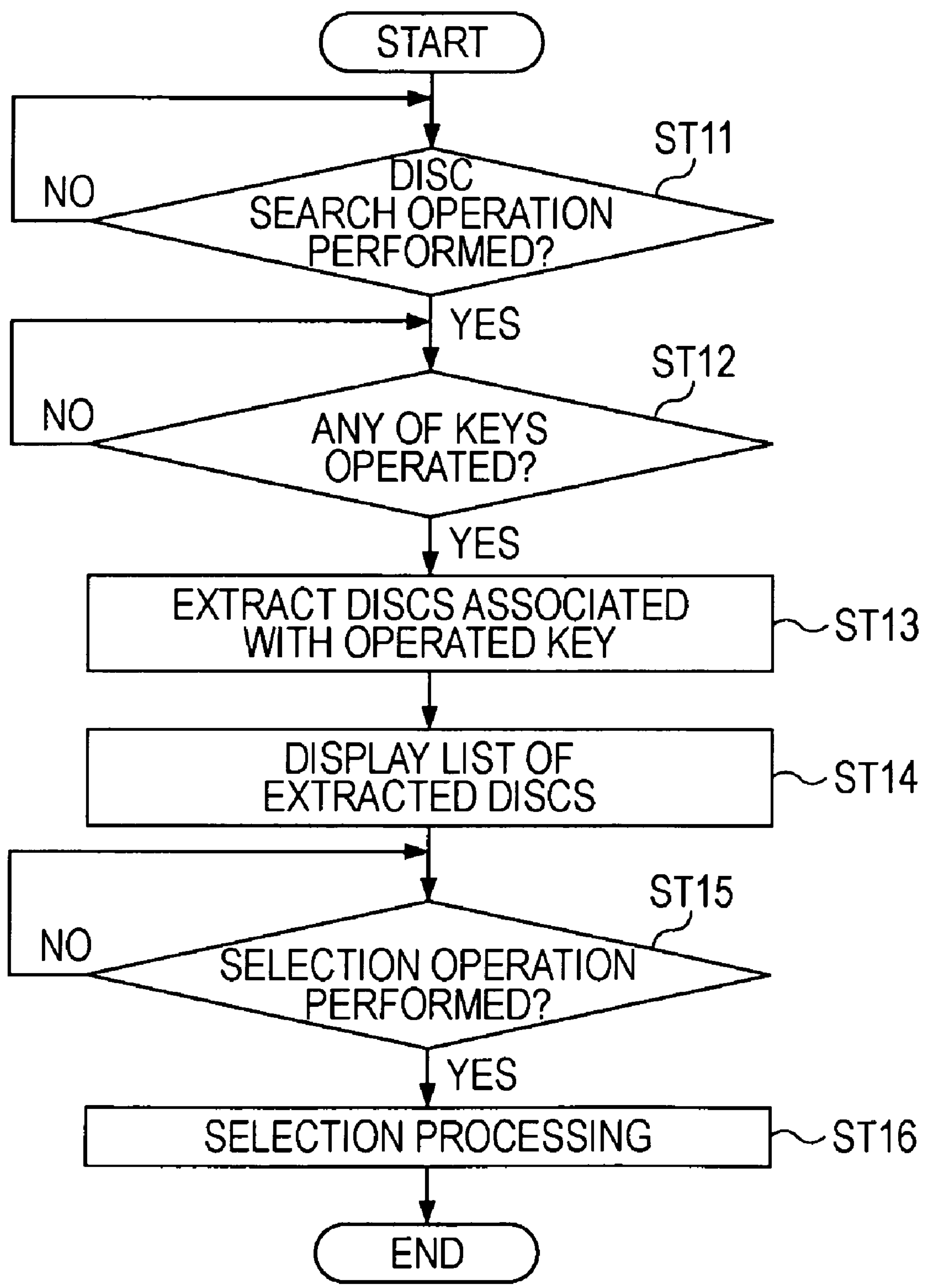
FIG. 4 is a flowchart illustrating an example of operation of the disc storage apparatus when the user searches for a desired one of discs inserted into and stored in the disc storage apparatus.

FIG. 4 is a flowchart illustrating an example of the operation of the disc storage apparatus 100 when the user searches for a desired one of discs inserted into and stored in the disc storage apparatus 100.

In step ST11, the main controller 3 determines whether or not a predetermined operation for searching for a disc is performed on the operation section 2. When it is determined that the predetermined operation for searching for a disc is performed, the process proceeds to step ST12. When it is determined that the predetermined operation is not performed, step ST11 is repeated.

In step ST12, the main controller 3 determines whether or not any of the keys 21-1 to 21-N is operated. When it is determined in step ST12 that any key is operated, the process proceeds to step ST13. When it is determined that any key is not operated, step ST12 is repeated.

In step ST13, on the basis of the key parameter n corresponding to the key operated in step ST12, the main controller 3 extracts discs associated with the key parameter n by referring to the disc storage table stored in the memory 4.

In step ST14, the main controller 3 displays, on the display section 5, a disc selection screen that displays a list of the discs extracted in step ST13.

On the disc selection screen, for example, the titles of the discs are displayed in a list. The titles of the discs can be obtained by the main controller 3 referring to the disc storage table in the memory 4. In this case, when information (such as disc titles) regarding the discs is not stored in the disc storage table, serial numbers (disc 1, disc 2, . . . , and so on) or the like may be displayed instead.

In step ST15, the main controller 3 determines whether or not an operation for selecting any of the discs is performed on the operation section 2 with the disc selection screen being displayed on the display section 5 in step ST14. When it is determined in step ST15 that the operation is performed, the process proceeds to step ST16. When it is determined that the operation is not performed, step ST15 is repeated.

In step ST16, in response to the selection operation determined in step ST15 as being performed on the operation section 2, the main controller 3 performs processing corresponding to the operation on the selected disc. That is, the main controller 3 executes processing, such as playback of the selected disc, retrieval of the disc, or recording to the disc.

As described above, by presetting one of the keys 21-1 to 21-N to be used to close the disc slot 13 after the disc insertion, the user can easily select a disc inserted by him/her from discs stored in the storage section 12. Thus, even when a large number of discs are stored in the disc storage apparatus 100, the user can easily extract discs inserted by him/her and can easily find a desired one from the extracted discs.

As described above, according to the disc storage apparatus 100 of the first embodiment, one of the N keys 21-1 to 21-N which is operated when a disc is inserted through the disc slot 13 and the disc slot 13 is closed is associated with the storage location in which the inserted disc is stored, the storage location being provided in the disc storage section 12, and is stored in the memory 4 as the disc storage table. During search of stored discs, discs in the storage locations associated with an operated one of the keys 21-1 to 21-N are extracted and are displayed on the display section 5. With this arrangement, for example, performing presetting so that a predetermined key is to be used for each of different categories during insertion of a disc allows with which category the stored disc is associated to be easily identified by referring to the disc storage table. That is, the main controller 3 can easily extract discs corresponding to each category by referring to the disc storage table. With this arrangement, the user can easily recognize discs in each category and thus can easily find a desired one of the discs.

<Second Embodiment>

The first embodiment described above has been given of an example of a configuration in which the disc storage apparatus 100 has the operation section 2 with the multiple keys 21-1 to 21-N. According to a second embodiment of the resent invention, the operation section 2 has a selection key 22 and an execution button 23 instead of the keys 21-1 to 21-N.

Figure 5:
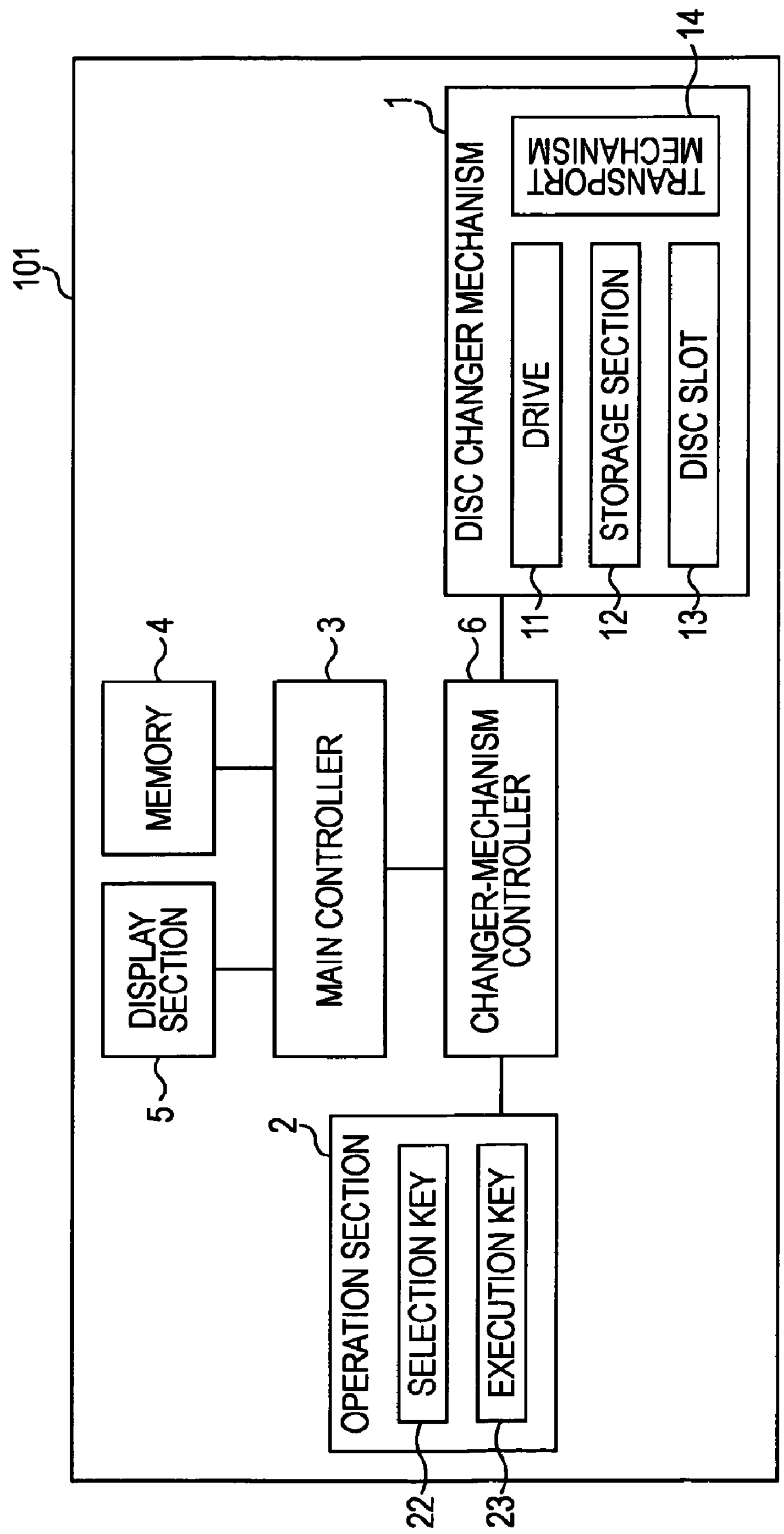
FIG. 5 is a block diagram showing one example of the configuration of a disc storage apparatus according to a second embodiment of the present invention.

FIG. 5 shows one example of a disc storage apparatus 101 according to the second embodiment of the present invention.

In the disc storage apparatus 101 according to the second embodiment, at least one category for disc classification is pre-registered before insertion of a disc. The category registration is performed by, for example, a user operation via the operation section 2. Examples of categories to be registered include the names of users who insert discs and the genres of content on the discs.

Figure 6:
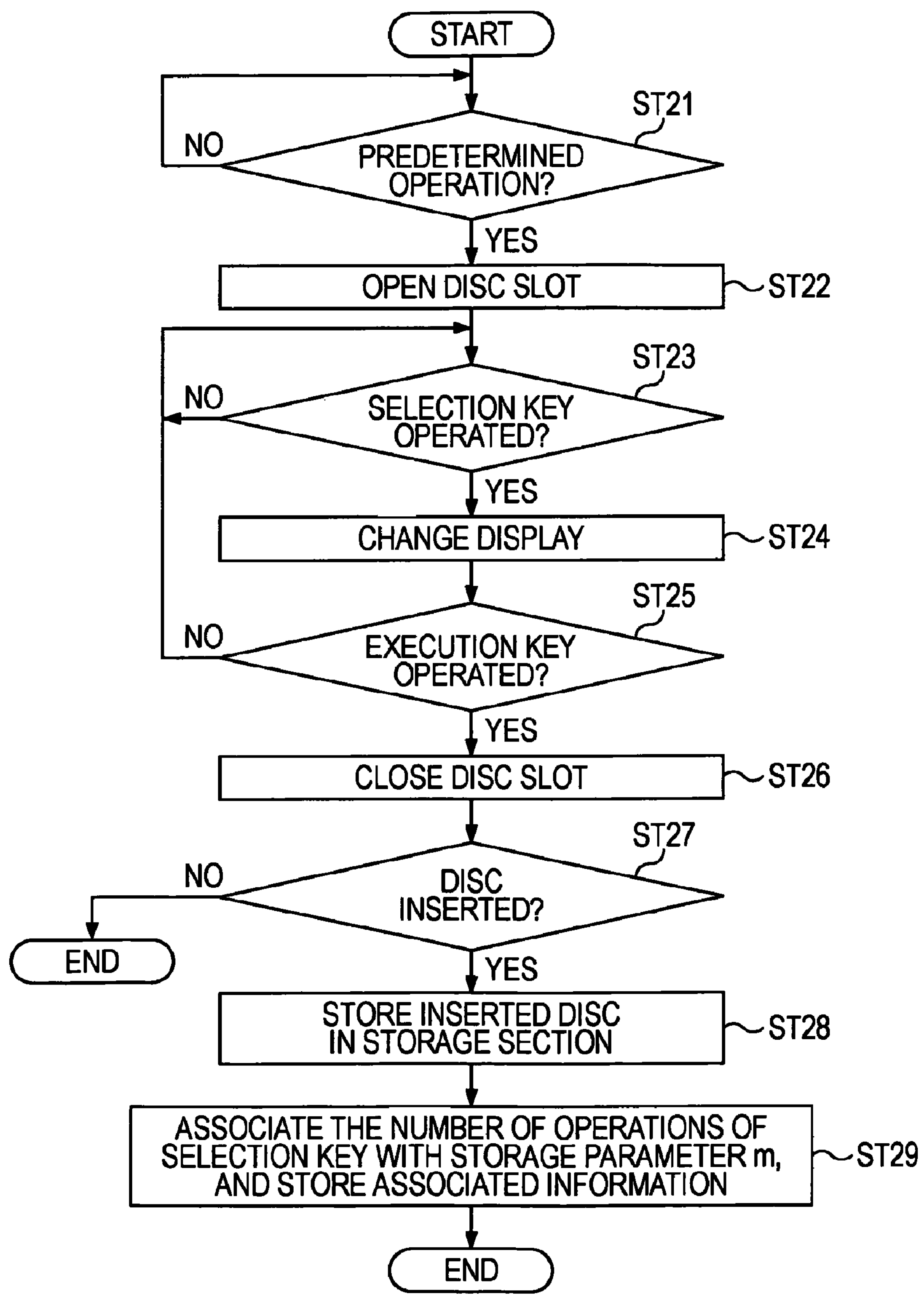
FIG. 6 is a flowchart showing an example of the operation of the disc storage apparatus according to the second embodiment.

FIG. 6 is a flowchart showing an example of operation of the disc storage apparatus 101 according to the second embodiment.

In step ST21, the main controller 3 determines whether or not a predetermined operation is performed on the operation section 2. When it is determined that a predetermined operation is performed on the operation section 2, the process proceeds to step ST22. When it is determined that a predetermined operation is not performed, step ST21 is repeated. The predetermined operation performed on the operation section 2 in step ST21 refers to, for example, an operation of pressing an open key (not shown) provided on the operation section 2.

In step ST22, the main controller 3 opens the disc slot 13 of the disc changer mechanism 1 in response to the predetermined operation performed on the operation section 2 in step ST21.

In step ST23, the main controller 23 determines whether or not the selection key 22 of the operation section 2 is operated. When it is determined that the selection key 22 is operated, the process proceeds to step ST24. When it is determined that the selection key 22 is not operated, step ST23 is repeated.

In step ST24, the main controller 3 changes what is displayed on the display section 5 in response to the operation of the selection key 22 in step ST23.

More specifically, the display section 5 displays one of at least one pre-registered category, and the main controller 3 changes the category currently displayed on the display section 5 to a different category, each time an operation performed on the selection key 22 is detected in step ST23. The order of categories displayed on the display section 5 is predetermined, for example, during the registration of the categories, and the category displayed on the display section 5 is changed in the display order.

One example in which a displayed category is switched in accordance with an operation performed on the selection key 22 in the second embodiment will now be described with reference to FIG. 7.

Figure 7:
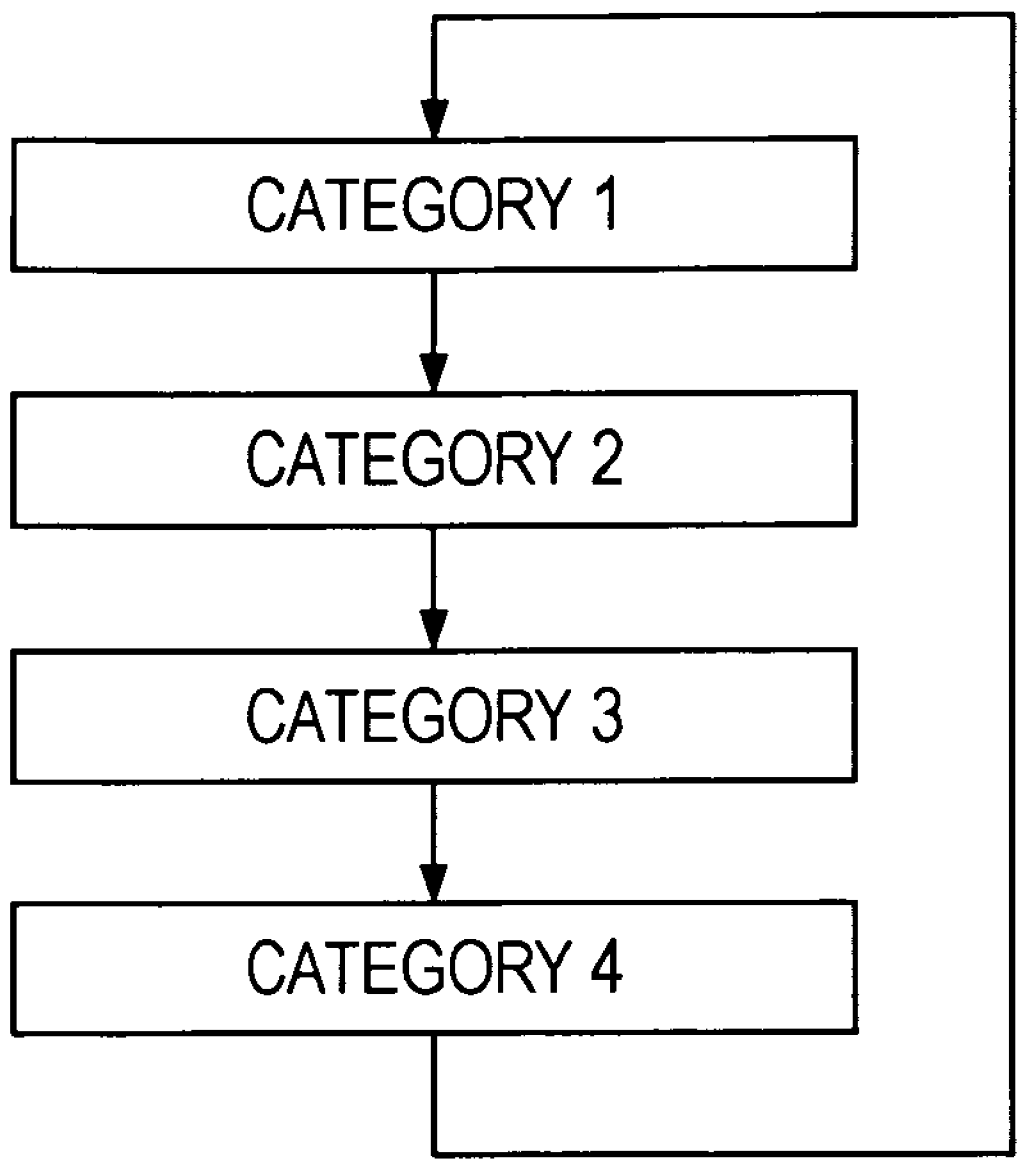
FIG. 7 is a diagram showing one example in which a displayed category is switched in response to an operation performed on a selection key in the second embodiment.

As shown in FIG. 7, each time the selection key 22 is operated, the category is switched for display. When the selection key 22 is operated during display of a last one of the registered categories, the process may return to its initial category for display.

In step ST25, the main controller 3 determines whether or not the execution key 23 of the operation section 2 is operated. When it is determined that the execution key 23 is operated, the process proceeds to step ST26. When it is determined that the execution key 23 is not operated, the process returns to step ST23.

In step ST26, the main controller 3 closes the disc slot 13 of the disc changer mechanism 1 in response to the operation of the execution key 23 in step ST25.

In step ST27, the main controller 3 determines whether or not a disc is inserted through the disc slot 13 opened in step ST22 before it is closed in step ST26. When it is determined that a disc is inserted, the process proceeds to step ST28. When it is determined that no disc is inserted, the processing ends.

In step ST28, the main controller 3 stores, in the storage section 12 in the disc changer mechanism 1, the disc inserted through the disc slot 13 between step ST22 and step ST25.

In step ST29, the main controller 3 associates the number of operations of the selection key 22 from when the disc slot 13 is opened in step ST22 until the execution key 23 is operated in step ST25 with the storage location in which the disc is stored in step ST28, the storage location being provided in the storage section 12.

More specifically, for example, when the selection key 22 is operated three times from when the disc slot 13 is opened in step ST22 until the execution key 23 is operated in step ST25, i.e., when the execution key 23 is operated while the display of the fourth one of the preregistered categories is displayed on the display section 5, the fourth category is associated with the corresponding storage location in the storage section 12. In this case, the main controller 3 may be configured so that it generates a table in which the number of operations of the selection key 22 is associated with the storage location(s) in the storage section 12 and stores the generated table in the memory 4. Alternatively, the main controller 3 may be configured so that it generates a table in which a determined category, instead of the number of operations of the selection key 22, is associated with the storage location(s) in the storage section 12.

As described above, in the disc storage apparatus 101 according to the second embodiment of the present invention, the number of operations of the selection key 22 until the execution key 23 is operated, i.e., any one of at least one pre-registered category, is associated with the storage location(s) in the storage section 12, and information indicating the association is stored in the memory 4. Thus, when the user selects a category to search for a desired disc, discs belonging to the selected category are displayed in a list to thereby allow him/her to easily find the disc.

The present invention is not limited to the above-described embodiments.

That is, various changes and alterations can be made to the elements in the above-described embodiments to implement the present invention within the technical scope thereof and a scope that is equivalent thereto.

It should be understood by those skilled in the art that various modifications, combinations, sub-combinations and alterations may occur depending on design requirements and other factors insofar as they are within the scope of the appended claims or the equivalents thereof.

What is claimed is:

1. A disc storage apparatus comprising:

a disc changer mechanism including a disc slot through which a disc is insertable, a storage section having storage locations that are capable of storing discs inserted through the disc slot, and a transport mechanism that transports the disc, inserted through the disc slot, to any of the storage locations in the storage section;

an operation section having operations keys;

a display section; and a controller configured to cause, when the disc is inserted through the disc slot and any of the operations keys is operated, the disc slot to be closed and the transport mechanism to store the inserted disc in any of the storage locations, and to associate the operated operation key with the storage location in which the disc is stored, wherein in accordance with a predetermined operation that is performed on the operation section and that includes an operation performed on any of the operation keys, the controller extracts, of discs stored in the storage section, all discs stored in the storage locations associated with the operated operation key, and causes information regarding all the extracted discs to be displayed on the display section, such that when the disc is inserted through the disc slot and a respective one of the operation keys is operated the disc slot is closed, the transport mechanism stores the inserted disc in the storage location, and the respective operation key is associated with the storage location in which the disc is stored and when the same respective operation key is operated during an extraction operation the disc stored in the storage location along with any other discs stored in storage locations associated with the operated operation key are caused to be extracted.

2. The disc storage apparatus according to claim 1, further comprising a memory, wherein the disc changer mechanism further includes a drive for writing data to and reading data from the disc, and the controller is connected to a predetermined network, obtains predetermined information regarding the disc from the predetermined network on a basis of predetermined data read from the disc by the drive, and causes the predetermined information to be stored in the memory.

3. The disc storage apparatus according to claim 2, wherein the controller creates a table by associating at least two of the predetermined information regarding the disc, the storage location in which the disc is stored, and the operation key operated when the disc was inserted, and causes the created table to be stored in the memory.

4. A disc storage method for a disc storage apparatus having a disc changer mechanism including a disc slot through which a disc is insertable, a storage section having storage locations that are capable of storing discs inserted through the disc slot, and a transport mechanism that transports the disc inserted through the disc slot to any of the storage locations in the storage section; an operation section having operations keys; and a display section, the disc storage method comprising the steps of:

determining whether or not any of the operation keys is operated;

determining whether or not a disc is inserted through the disc slot, when it is determined in the operation-key operation determining step that any of the operation keys is operated;

causing the disc slot to be closed and the transport mechanism to store the inserted disc in any of the storage location, when it is determined that the disc is inserted through the disc slot in the inserted-disc determining step;

associating the operated key determined to be operated in the operation-key determination step with the storage location in which the disc is stored in the disc storing step;

determining whether or not a predetermining operation including an operation on any of the operation keys is performed on the operation section;

extracting, of discs stored in the storage section, all discs stored in the storage locations associated with the operated operation key, when it is determined that the predetermined operation is performed in the predetermined-operation determining step; and displaying information, on the display section, information regarding all the discs extracted in the disc extracting step, such that when the disc is inserted through the disc slot and a respective one of the operation keys is operated the disc slot is closed, the transport mechanism stores the inserted disc in the storage location, and the respective operation key is associated with the storage location in which the disc is stored and when the same respective operation key is operated during the extracting the disc stored in the storage location along with any other discs stored in storage locations associated with the operated operation key are caused to be extracted.

* * * * *